US005100097A

United States Patent [19]

Liebig et al.

[11] Patent Number: 5,100,097

[45] Date of Patent: Mar. 31, 1992

[54] DRAFTING CADDY FOR USE WITH TRACK TYPE DRAFTING MACHINES ON INCLINED DRAFTING SURFACES

[76] Inventors: Thomas J. Liebig; Sharon A. Liebig, both of 2787 So. 165th Ave., Omaha, Nebr. 68130

[21] Appl. No.: 531,903

[22] Filed: Jun. 1, 1990

[51] Int. Cl.[5] ............ F16M 13/00

[52] U.S. Cl. ............ 248/682; 248/316.1; 211/13; 206/214; 206/371

[58] Field of Search ............ 248/682, 689, 450, 453, 248/473, 146, 152, 158, 176, 309.1, 310, 316.1; 206/214, 224, 371; 211/13, 69.1, 69.5; 108/25, 26.1; 33/299, 562, 563

[56] References Cited

U.S. PATENT DOCUMENTS

| | | | |
|---|---|---|---|
| 33,849 | 1/1901 | Meyer | 211/13 |
| 1,704,561 | 3/1929 | Egan | 248/453 |
| 1,829,360 | 10/1931 | Lambert | 248/473 |
| 2,520,490 | 8/1950 | Bowand | 211/13 |
| 3,779,504 | 12/1973 | Schwarz . | |
| 4,373,639 | 2/1983 | Tricon | 211/86 |
| 4,406,368 | 9/1983 | Hermes | 206/371 |
| 4,510,872 | 4/1985 | Parry | 211/50 |
| 4,786,023 | 11/1988 | Harris | 248/311.2 |

FOREIGN PATENT DOCUMENTS 879692 11/1942 France .

*Primary Examiner*—Ramon O. Ramirez
*Assistant Examiner*—Robert A. Olson

[57] ABSTRACT

A rigid base plate (20), (22), or (24) attaches to and is supported by or is manufactured as part of the vertical carriage plate (34) of a track type drafting machine. A rigid base plate (26 ), (28), or (30) attaches to and is supported by the vertical carriage plate (36) of a track type drafting machine. These base plates (20), (22), (24), (26), (28), or (30) support a matrix of elongated retainers (32) or other retaining mechanisms. These retainers (32) or non-scratching mechanisms must have the ability to retain drafting templates or curves on drafting surfaces from horizontal thru vertical and be easy to use. Said base plate (20), (22), (24), (26), (28), or (30) may be designed to contain trays for compasses, areas for calculators and be of single or multi-level design. This allows frequently used drafting tools to remain within easy reach of drafting person, allowing them to move without impairment and be more productive.

1 Claim, 3 Drawing Sheets

DRAFTING CADDY FOR USE WITH TRACK TYPE DRAFTING MACHINES ON INCLINED DRAFTING SURFACES

BACKGROUND

1. Field of Invention

This invention relates to providing easy access of drafting related equipment by supporting a holder from the vertical carriage plate of a track type drafting machine.

2. Description of Prior Art

Operators of drafting machines on steeply inclined drafting tables, to eliminate drafting machine or operator impairment, are forced to place their equipment on other surfaces. These surfaces include desk tops, among reference material, in drawers and on chair bottoms in an effort to keep equipment from falling to floor. By using the above mentioned methods of storing drafting equipment, it is understandable that considerable time is wasted by not having commonly used equipment within easy reach of the drafting persons.

Letter holders and similar devises have been utilized to hold drafting equipment. This type of devise is manually positioned, constantly in the way requiring repositioning and only effective on nearly horizontal drafting surfaces.

The following inventors have created several types of drafting equipment holders in an effort to ease the drafting task. U.S. Pat. No. 4,373,639 to Tricon (1983) provided for a stationary right hand or left hand, clamp type, mounting for storage devises used buy drafting persons; however, in todays congested work spaces with larger drawings, drafting board space is not available, drafting machine movement is impaired, and drafting tools would only be easily accessible when work was being performed adjacent to the holder. U.S. Pat. No. 4,510,872 to Parry (1985) a holder for templates and triangles; however, the holder is to be mounted to the eraser trough, dangling from the bottom edge of the drafting board, even though it is designed to move from side to side, this means of location and swaying mounting would constantly be in the way, hard to access and continually slowing drafting productivity. U.S. Pat. No. 4,786,023 to Harris (1988) provided a track type mounting for a can type drafting implement receptacle; however, the holder is designed for attachment to the edge of the drafting table top by means of a mounting structure, no provisions were included to retain drafting templates or similar equipment, this type of holder design would either be in the way or out of easy reach of the drafting person, slowing or impairing drafting machine movement and operators progress. U.S. Pat. No. 4,406,368 to Hermes (1983) a drawing tool organizer comprising a plurality of units adapted to hold varied drawing tools, and connectors for releasably securing said plurality of units one to the other; however, the organizer is designed to be located at the edge of, clamped to and supported by a drafting table or other structure, this type of mounting to a drafting table would impair drafting machine movement, be inconvenient to access or clutter work space.

OBJECTS AND ADVANTAGES

Accordingly, besides the objects and advantages of the drafting equipment caddy described in my above patent, several objects and advantages of present invention are:

(a) to provide a holder that is totally supported by the vertical carriage plate of track type drafting machines;

(b) to provide a holder that is automatically positioned by moving the scale indexing head;

(c) to provide a holder position that is always adjacent to the drafting scale head;

(d) to provide easy access for frequently used drafting equipment;

(e) to provide a holder that retains drafting equipment from horizontal thru a vertical drafting table attitude;

(f) to provide a holder allowing easy removal and replacement of drafting equipment;

(g) to allow concept incorporation into new drafting machine designs;

(h) to provide a means of retrofiting existing drafting machines; and (i) to provide an inexpensive holder for drafting persons.

Further objects and advantages are to provide interchangeable holders and methods of attachment which does not impose any drafting machine restraint or operator impairment.

DRAWING FIGURES

In the drawings, closely related figures have the same number but different alphabetic suffixes.

FIGS. 1A thru 1C shows three isometric views of the unlimited configurations holders could employ, while nesting onto an extended vertical carriage plate of a proposed redesign to new track type drafting machines.

FIGS. 1D thru 1F shows three isometric views of the unlimited configurations holders could employ retrofitting existing track type drafting machines.

REFERENCE NUMERALS IN DRAWINGS

| |
|---|
| 20 Base plate |
| 22 Base plate |
| 24 Base plate |
| 26 Base plate |
| 28 Base plate |
| 30 Base plate |
| 32 Elongated retainers |
| 34 Extended vertical carriage plate |
| 36 Non-extended vertical carriage plate |

Figure 1A:
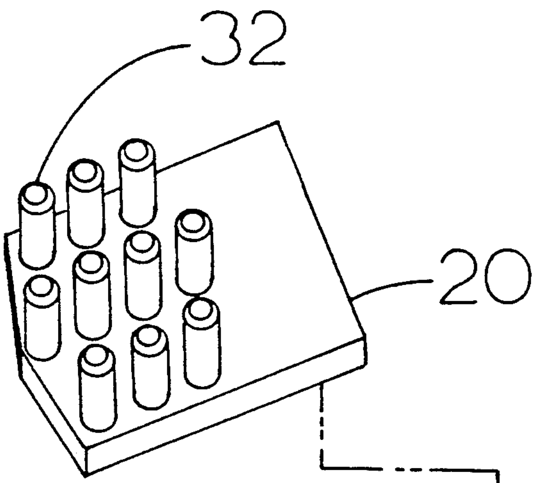
Figure 1B:
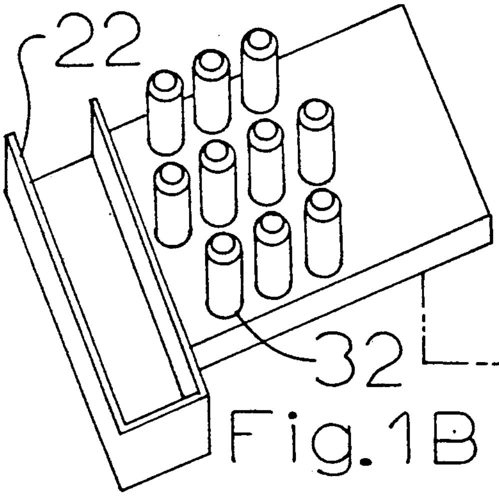
Figure 1C:
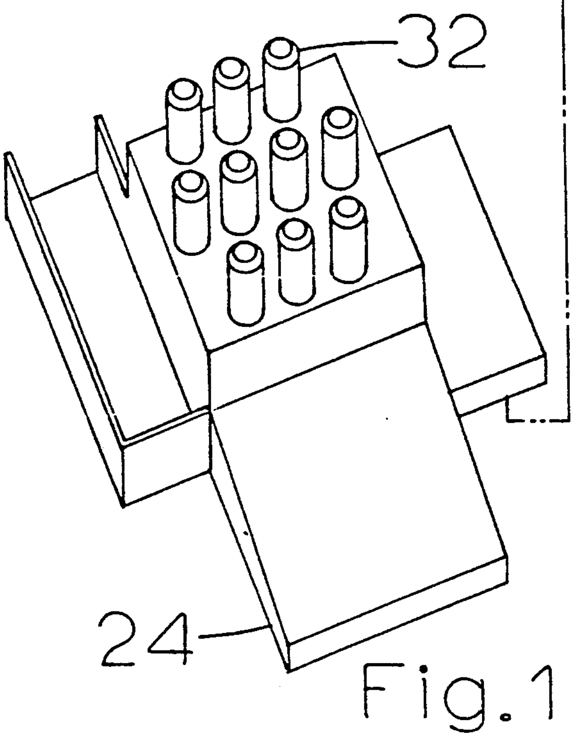
Figure 2:
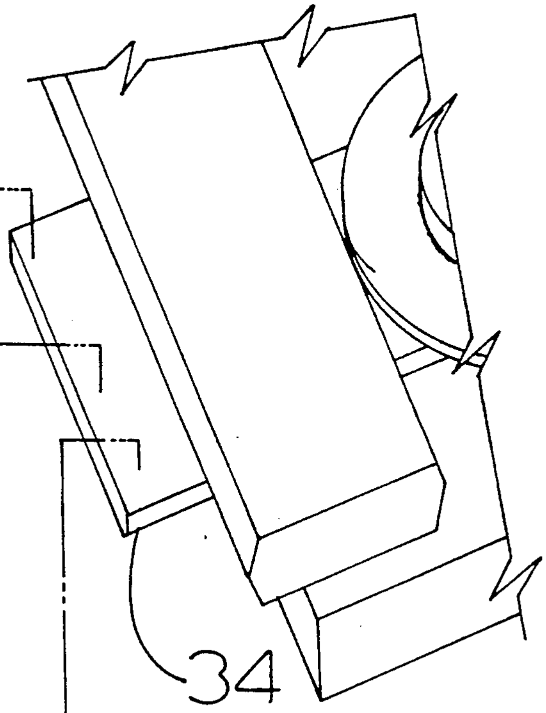
FIG. 2 shows an isometric view of track type drafting machine with an extended vertical carriage plate.
Figures 1D, 1E, 1F, 3:
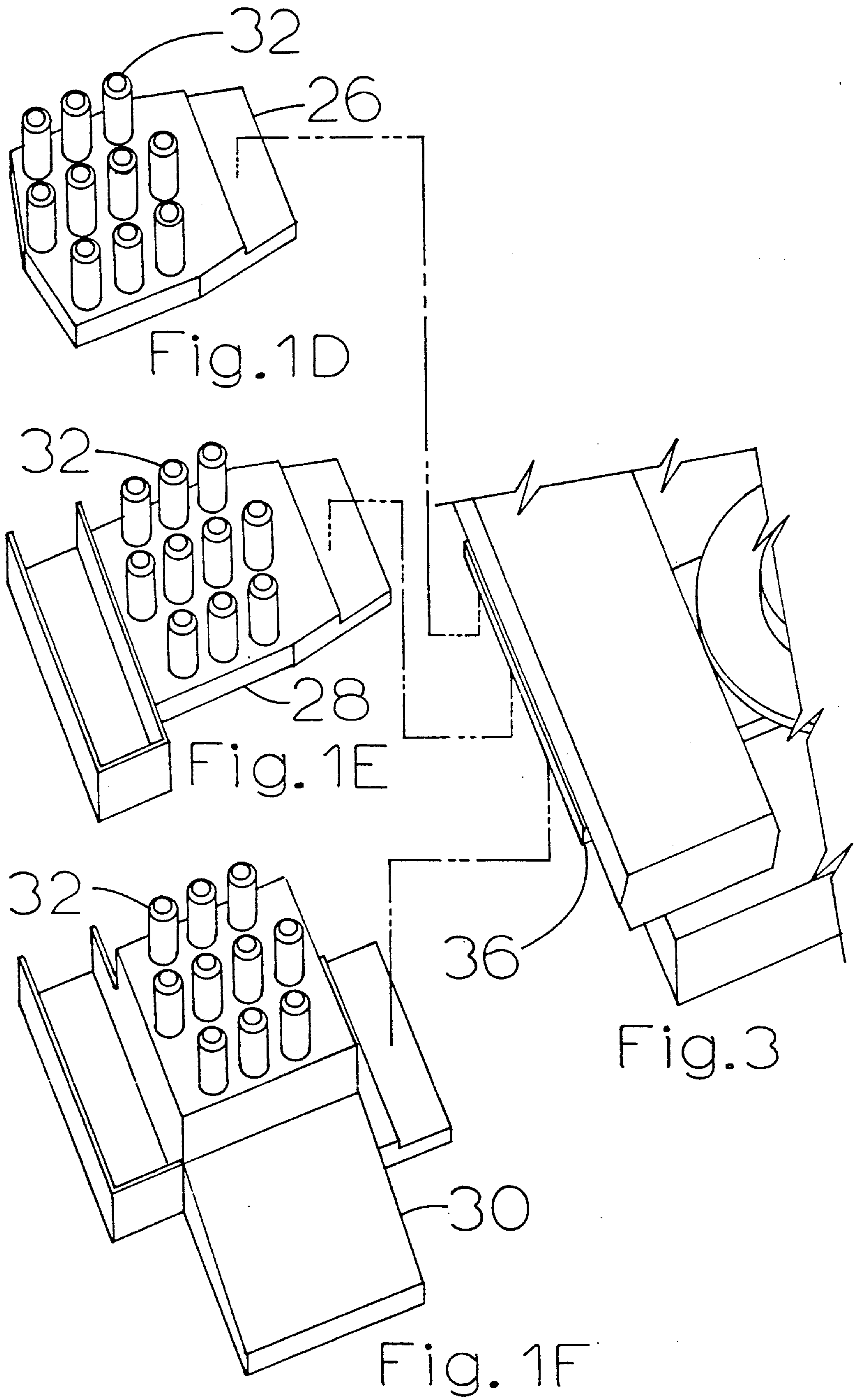
FIG. 3 shows an isometric view of track type drafting machine with a current, non-extended vertical carriage plate.

DESCRIPTION-FIGS. 1 thru 3

Typical embodiments of the caddy of the present invention, for track type drafting machines with extended vertical carriage plate 34 (FIG. 2 isometric view), are illustrated in FIG. 1A thru 1C (all isometric views). The caddy consists of a rigid plastic or other suitable material base plate 20, 22, and 24, but not limited to configurations shown.

Typical embodiments of the caddy of the present invention, for retrofitting existing track type drafting machines with non-extended vertical carriage plate 36

(FIG. 3 isometric view), are illustrated in FIG. 1D thru 1F (all isometric views). The caddy consists of a rigid plastic or other suitable material base plate 26, 28, and 30, but not limited to the configurations shown.

The fore mentioned base plates, 20 (FIG. 1A isometric view), 22 (FIG. 1B isometric view), 24 (FIG. 1C isometric view), 26 (FIG. 1D isometric view), 28 (FIG. 1E isometric view), 30 (FIG. 1F isometric view), but not restricted to vacuum formed ABS plastic obtainable from plastic suppliers. Attached to or manufactured as part of the fore mentioned base plates 20, 22, 24, 26, 28, and 30, in FIG. 1A thru 1F (all isometric views) is a matrix of but not restricted to, semi-rigid, non-scratching elongated retainers 32, which could be comprised of but not limited to "O"-ring material commonly available from hydraulic repair companies.

These elongated retainers 32 can be manufactured as part of or affixed to 20, 22, 24, 26, 28, and 30, but not limited to use of an appropriate fastener or adhesive.

In FIG. 1A base plate 20 (isometric view) and in FIG. 1D base plate 26 (isometric view) shows the ability to retain drafting objects such as, but not restricted to, drafting templates and curves.

In FIG. 1B base plate 22 (isometric view) and in FIG. 1E base plate 28 (isometric view) shows the ability to retain drafting objects and has a tray to hold small objects such as compass or pencils.

In FIG. 1C base plate 24 (isometric view) and in FIG. 1F base plate 30 (isometric view) shows the ability to retain drafting objects, has a tray to hold compass or other objects and has a protrusion to support calculator or similar equipment.

There are numerous configurations this concept can employ, depending upon requirements imposed on the drafting person, the caddy will also accept a multi-level approach even though a single level is depicted in FIG. 1A thru 1F (all isometric views). By using the elongated retainers 32, or another suitable retaining method, more than one template or curve maybe inserted within a given location.

METHOD OF MOUNTING

In FIGS. 1A, 1B, and 1C (all isometric views), the method of attaching base plate, 20 (FIG. 1A isometric view), 22 (FIG. 1B isometric view), 24 (FIG. 1C isometric view), to extended vertical carriage 34 (FIG. 2 isometric) view may be accomplished by, but not limited to, use of various fasteners or adhesive products.

In FIGS. 1D, 1E, and 1F, (all isometric views) the method of attaching base plate, 26 (FIG. 1D isometric view), 28 (FIG. 1E isometric view), 30 (FIG. 1F isometric view), to non-extended vertical carriage plate 36 (FIG. 3 isometric view) may be accomplished by, but not limited to use of various fasteners or adhesive products.

OPERATION OF CADDY

Figure 4:
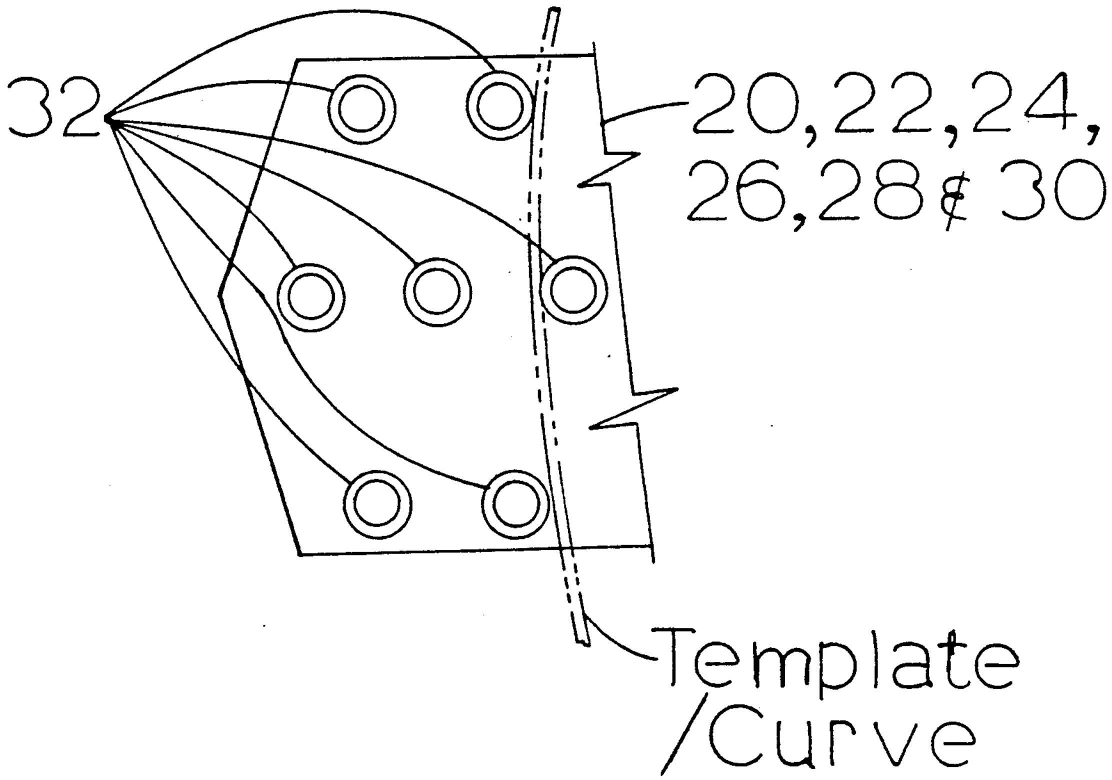
FIG. 4 shows a top view of drafting equipment being retained by elongated retainers.

In FIG. 4 (top view), to insert drafting objects such as templates and curves by arching them between a matrix of elongated non-scratching retainers 32, but not limited to pattern or type retainers shown. This is easily accomplished by indexing item to far retainer, center retainer then arching item to index near retainer.

Retrieval of items is easily accomplished by lifting drafting items clear of retainers.

Caddy location is automatically accomplished by the drafting person moving the drafting machine scale head over the drafting surface during normal drafting process.

Since the caddy is supported above the drafting surface by the vertical carriage of a track type drafting machine, the drafting caddy does not come in contact with, eliminating marring of, work in progress.

SUMMERY, RAMIFICATIONS,-AND SCOPE

Accordingly, the reader will see that the drafting caddy of this invention is a very important and necessary tool for drafting persons using track type drafting machines.

Furthermore, the caddy has additional advantages in that it is mounted to, supported by or manufactured as part of the vertical carriage plate of a track type drafting machine;

- it is automatically positioned by, constantly adjacent to, the drafting machines scale head assembly;
- it eliminates drafting machine restraint and drafting person impairment;
- it will be an inexpensive item to purchase;
- it creates a cleaner, safer work place;
- it saves valuable time searching for misplaced drafting equipment;
- it enables drafting persons to be more productive;
- it keeps drafting equipment within easy reach of work in progress;
- it keeps drafting equipment from falling to floor and probable damage;
- it is very convenient to use;
- it helps eliminate the necessity of placing drafting equipment in use on desk tops, chair seats or in drawers;
- it is easily installed on existing drafting machines;
- it can be readily incorporated into new drafting machine designs;
- it retains drafting equipment on drafting table positions from horizontal thru vertical; and
- it can be incorporated directly into vertical carriage plates of new drafting machines eliminating need of mounting.

Although the descriptions above list many advantages, these should not be construed as limiting the scope of this invention but as merely providing illustrations of some of the advantages of using this invention.

For example the caddy can have other shapes, sizes, methods of retaining drafting tools, have more than one level, configuration, etc.

Thus the scope of the invention should be determined by the appended claims and their legal equivalents rather than by examples given.

I claim:

1. In combination, a vertical carriage plate assembly of a track type drafting machine, and a drafting equipment holder comprising a rigid base plate with elongated retainers intermittently positioned in a nonlinear pattern and adapted to hold drafting equipment therebetween, one of said base or carriage plate including a securing plate extending coplanar therefrom, and fastening means securing said securing plate to the other of the base and carriage plate that they are substantially coplanar.

* * * * *